US007891881B2

(12) United States Patent
Sakaki

(10) Patent No.: US 7,891,881 B2
(45) Date of Patent: Feb. 22, 2011

(54) DRAWN CUP ROLLER BEARING

(75) Inventor: Yoshiaki Sakaki, Hamura (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 597 days.

(21) Appl. No.: 11/798,859

(22) Filed: May 17, 2007

(65) Prior Publication Data

US 2007/0269156 A1 Nov. 22, 2007

(30) Foreign Application Priority Data

May 18, 2006 (JP) ........................... P2006-138458

(51) Int. Cl.
*F16C 33/46* (2006.01)
*F16C 33/54* (2006.01)
*F16C 33/56* (2006.01)

(52) U.S. Cl. ........................ 384/572; 384/573; 384/576

(58) Field of Classification Search ................. 384/560, 384/572, 573, 576, 580, 582, 523, 526, 527, 384/564, 470

See application file for complete search history.

(56) References Cited

U.S. PATENT DOCUMENTS

| | | | | |
|---|---|---|---|---|
| 1,996,841 | A * | 4/1935 | Stevens | 384/527 |
| 2,894,791 | A * | 7/1959 | White et al. | 384/564 |
| 5,482,150 | A * | 1/1996 | Stark | 192/45 |
| 5,833,373 | A * | 11/1998 | Ueno et al. | 384/527 |
| 6,808,310 | B2 * | 10/2004 | Ooitsu et al. | 384/527 |

FOREIGN PATENT DOCUMENTS

| | | |
|---|---|---|
| JP | 4-175511 | 6/1992 |
| JP | 6-264930 | 9/1994 |
| JP | 10-274242 | 10/1998 |
| JP | 2002-295485 | 10/2002 |
| JP | 2005-106252 | 4/2005 |
| JP | 2005-163994 | 6/2005 |
| JP | 2005-172037 | 6/2005 |
| JP | 2007-56932 | 3/2007 |

OTHER PUBLICATIONS

European Search Report dated Jun. 23, 2008.
Japanese Office Action dated Apr. 7, 2010 with English translation thereof.

* cited by examiner

*Primary Examiner*—Richard W Ridley
*Assistant Examiner*—Terence Boes
(74) *Attorney, Agent, or Firm*—McGinn IP Law Group, PLLC

(57) ABSTRACT

A drawn cup roller bearing includes: an outer ring including a raceway surface; a first rib formed at one end of the outer ring by being bent substantially perpendicular to the raceway surface; a second rib formed at the other end of the outer ring by being bent inwardly so as to be substantially parallel to the raceway surface; a cage including pockets for holding rollers, respectively; and an annular projection stopper which is projected radially outwardly and provided over an entire outer circumference at a pocket side position of an outer circumferential surface of the cage. An end surface of the cage abuts against a part of the first rib and the annular projection stopper is interposed between an end surface of the second rib and the rollers in a state that the cage is assembled into the outer ring.

5 Claims, 3 Drawing Sheets

DRAWN CUP ROLLER BEARING

BACKGROUND OF THE INVENTION

The present invention is related to a drawn cup roller bearing used in a vehicular transmission and various types of industrial machineries.

In a related drawn cup roller bearing in which a cage for holding rollers is assembled into an outer ring having ribs at opposite ends, one of the ribs at one end is formed by being bent in almost perpendicular to a raceway surface of the outer ring and a space defined between the rib, the outer ring and the rollers is formed as a lubricant retaining space. The rib at the other end is formed by being bent inwardly so as to be almost parallel to the raceway surface so that the cage is assembled into the outer ring from the side of this rib.

When the cage and the rollers in a state which these are set together are assembled into the outer ring, a part of the one of the ribs is abutted against the cage, and a part of the other rib is abutted against the rollers. Therefore, in the case that a load is applied to the rollers in an axial direction, since movement of the rollers in the axial direction is restricted, both the rollers and the cage are prevented from falling off from the outer ring (see JP2005-172037A).

However, in the related drawn cup roller bearing, the rollers may come over the rear side bent rib which is bent inwardly so as to be almost parallel to the raceway surface when the rollers expand an inscribed circle shape of the outer ring during an insertion of a shaft, thereby the function of preventing the rollers from falling off is insufficient. Further, if the rollers may come over the rear side bent rib due to the skew of the rollers at the time of use, and clearances are formed between the part of the rear side bent rib and the rollers and between an outer circumferential surface of the cage and an inner circumferential surface of the rear side bent rib by an axial load of the rollers, grease inside the bearing may flow out to the exterior from the clearances.

SUMMARY OF THE INVENTION

The present invention is made in view of the above problem, and an object of the invention is to provide a drawn cup roller bearing capable of preventing a cage and rollers from falling off from an outer ring and preventing grease inside the bearing from flowing out to the exterior.

In order to solve the above problem, the present invention is characterized by having the following arrangement.

(1) A drawn cup roller bearing comprising:

an outer ring including a raceway surface;

a first rib formed at one end of the outer ring by being bent substantially perpendicular to the raceway surface;

a second rib formed at the other end of the outer ring by being bent inwardly so as to be substantially parallel to the raceway surface;

a cage including pockets for holding rollers, respectively; and an annular projection stopper which is projected radially outwardly and provided over an entire outer circumference at a pocket side position of an outer circumferential surface of the cage, wherein an end surface of the cage abuts against a part of the first rib and the annular projection stopper is interposed between an end surface of the second rib and the rollers in a state that the cage is assembled into the outer ring.

(2) The drawn cup roller bearing according to (1), wherein the cage is made of synthetic resin, and an annular metal wire is embedded inside the annular projection stopper.

(3) The drawn cup roller bearing according to (1), wherein the cage is made of metal, and an abutment surface of the annular projection stopper with respect to the end surface of the second rib and a portion of the outer circumferential surface of the cage which is located axially outside of the annular projection stopper are coated with low friction material.

According to the present invention, since the annular projection stopper which is projected radially outwardly is provided over an entire outer circumference at a pocket side position of an outer circumferential surface of the cage, when the cage and the needle rollers are assembled into the outer ring, the end surface of the cage abuts against a part of the abutment surface of the rib at the one end of the outer ring, the annular projection stopper of the cage is interposed between the end surface of the rib at the other end and the needle rollers, the annular projection stopper abuts against the end surface of the needle rollers and the end surface of the rib at the other end, and the annular projection stopper have a predetermined projection height. Therefore, even if the needle rollers expands the inscribed circle shape of the outer ring during the shaft is inserted into the center portion of the outer ring, or even if the needle rollers skew at the time of use of the bearing, the needle rollers do not come over the annular projection stopper which abuts against the end surface of the rib at the other end. Accordingly, the effect is provided in which the need rollers are prevented from falling out from the cage and the cage is prevented from falling out from the outer ring.

Further, even if the a load is applied to the needle rollers in an axial direction at the time of use of the bearing, even if some clearance is formed between the needle rollers and the annular projection stopper of the cage, a clearance is not formed between the annular projection stopper of the cage and the end surface of the rib at the other end of the outer ring. Therefore, even if lubricant, such as grease, inside the bearing flows out from the clearance between the needle rollers and the annular projection stopper of the cage to the outer circumferential surface of the shaft, the lubricant do not flow out from a portion between the annular projection stopper of the cage and the end surface of the rib at the other end of the outer ring to the exterior.

Further, since cage is made of synthetic resin and the annular metal wire is embedded inside the annular projection stopper, even if the surface of the annular projection stopper which abuts against the end surface of the rib at the other end is worn, because of the annular metal wire, the abrasion is stopped at the annular metal wire and thus the resistance performed is improved.

On the other hand, since the cage is made of metal, and an abutment surface of the annular projection stopper with respect to the end surface of the second rib and a portion of the outer circumferential surface of the cage which is located axially outside of the annular projection stopper are coated with low friction material, a surface of the annular projection stopper where the low friction material is coated has a low friction property, and thus the resistance performed is improved.

DETAILED DESCRIPTION OF PREFERRED EMBODIMENTS

First Embodiment

Figure 1:
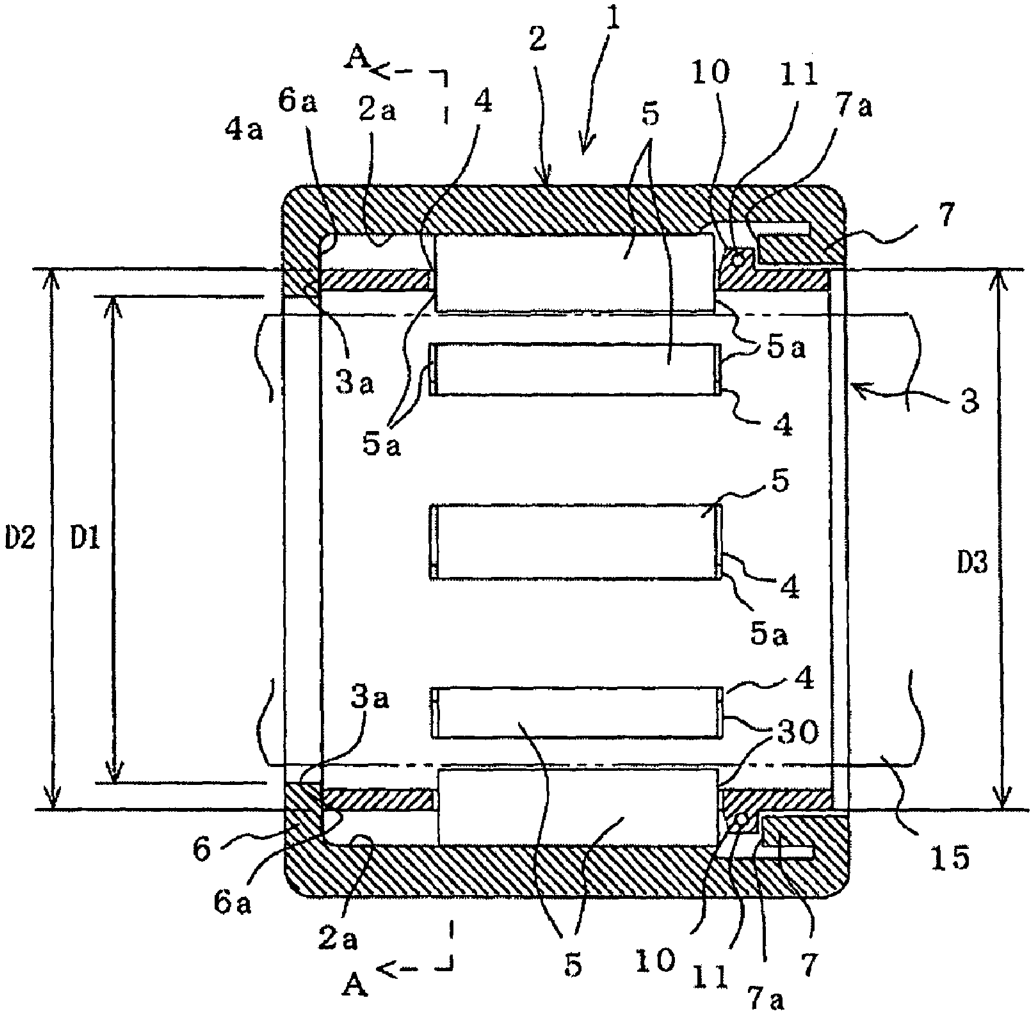
FIG. 1 is a sectional view showing an entire drawn cup roller bearing according to a first embodiment of the present invention.
Figure 2:
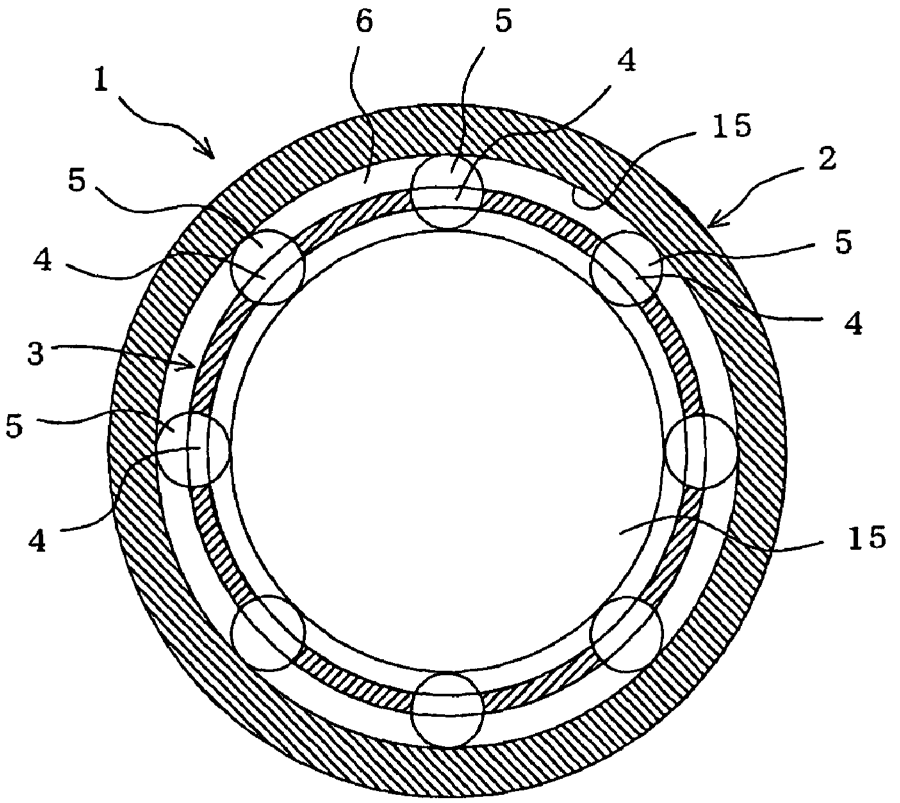
FIG. 2 is a sectional view along line A-A of FIG. 1.
Figure 3:
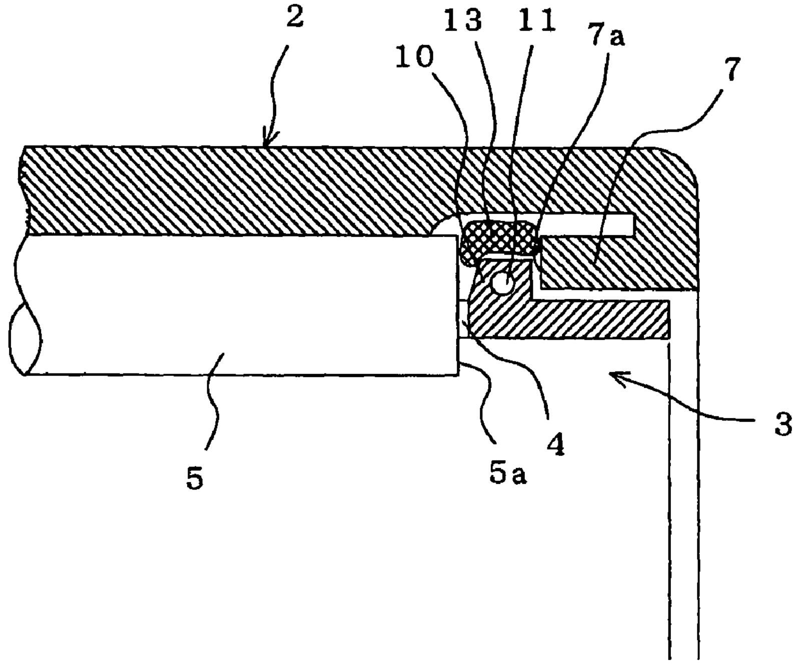
FIG. 3 is a section view showing a main part of the drawn cup roller bearing.

FIG. 1 is a sectional view showing an entire drawn cup roller bearing according to a first embodiment of the present invention. FIG. 2 is a sectional view along line A-A of FIG. 1. FIG. 3 is a section view showing a main part of the drawn cup roller bearing.

In FIGS. 1 and 2, a reference number 1 denotes the entire drawn cup roller bearing. The drawn cup roller bearing 1 includes a cylindrical outer ring 2, an annular cage 3 having a plurality of pockets arranged in a circumference direction for holding needle rollers 5. An outer diameter of the cage 3 is smaller than that of the outer ring 2.

The outer ring 2 includes an annular rib 6 at one end, and an annular ring 7 at the other end. The rib 6 at the one end of the outer ring 2 is bent substantially perpendicular to a raceway surface 2*a* of the outer ring 2 in a radially inward direction. An inner side surface of a radial end of the rib 6 is formed as a flat abutment surface 6*a* abutting against an end surface 3*a* of the cage 3. The rib 7 at the other end which is a rear bent side of the outer ring 2 is bent by almost 180 degrees toward the raceway surface of the outer ring 2.

An inner diameter D1 of the rib 6 at the one end is set to equal to or smaller than an outer diameter D2 of the annular cage 3. An inner diameter D3 of the rib 7 at the other end is set to equal to or larger than the outer diameter D2 of the cage 3.

An annular projection stopper 10 which is projected outwardly is provided over an entire outer circumference at a pocket side position of an outer circumferential surface of the cage 3. The cage 3 is made of synthetic resin and an annular metal wire 11 is embedded in the annular projection stopper 10.

An assembling procedure of the drawn cup roller bearing having the above arrangement will be described hereinafter.

First, the ribs 6, 7 are formed at the opposite end of the outer ring 2 in advance, and a predetermined hardness is applied to the outer ring 2 by applying heat treatment. Next, the cage 3 is assembled into the outer ring 2 in the axial direction. In this case, since the inner diameter D3 of the rib 7 is equal to or larger than the outer diameter D2 of the cage 3, the cage 3 can be easily assembled into the outer ring 2.

Then, the end surface 3*a* of the cage 3 is put in a state that it abuts against the abutment surface 6*a* of the rib 6, and the needle rollers 5 are assembled into the pockets 4 from an inner side in the radial direction of the cage 3, respectively.

Accordingly, in a state that the cage 3 is assembled into the outer ring 2 so as to hold the needle rollers 5, a part of the abutment surface 6*a* of the rib 6 at the one end abuts against the end surface 3*a* of the cage 3, and the annular projection stopper 10 is interposed between the end surface 7*a* of the rib 7 at the other end and the needle rollers 5.

In this case, even if the cage 3 receives pressing force in a radially outward direction by the needle rollers 5, because an inner circumferential surface of the cage 7 regulates the movement of the cage 3 by abutting against the outer circumferential surface of the cage 3 except the annular projection stopper 10, a state that the cage 3 is almost parallel to the outer ring 2 can be maintained. Therefore, work for attaching the needle rollers 5 to the pockets 4 can be performed easily.

After the cage 3 and the needle rollers 5 are assembled into the outer ring 3 in the above manner, a shaft 15 is inserted into a center portion of the outer ring 2, and an outer circumferential surface of the shaft 15 functions as a raceway surface of an inner ring for the needle rollers 5.

According to the draw cup roller bearing according to the first embodiment, since the annular projection stopper 10 which is projected outwardly is provided over the entire outer circumference at the pocket side position of the outer circumferential surface of the cage 3, when the cage 3 and the needle rollers 5 are assembled into the outer ring 2, the end surface 3*a* of the cage 3 abuts against the part of the abutment surface 6*a* of the rib 6 at the one end of the outer ring 2, the annular projection stopper 10 of the cage 3 is interposed between the end surface 7*a* of the rib 7 at the other end and the needle rollers 5, the annular projection stopper 10 abuts against the end surfaces 5*a* of the needle rollers 5 and abuts against the end surface 7*a* of the rib 7 at the other end, and the annular projection stopper 10 has a predetermined projecting height. Therefore, when the shaft 15 is inserted into the center portion of the outer ring 2, the needle rollers 5 do not come over the annular projection stopper 10 which abuts against the end surface 7*a* of the rib 7 at the other end at the time that the needle rollers 5 expand the inscribed circle of the outer ring 2, and the needle rollers 5 are prevented from falling off from the cage 3, and further the cage 3 is prevented from falling off from the outer ring 2.

At the time of use of the bearing, even if the needle rollers 5 skew, since the annular projection stopper 10 abuts against the end surfaces 5*a* of the needle rollers 5 and abuts against the end surface 7*a* of the rib 7 at the other end, and the annular projection stopper 10 has the predetermined projection height, the needle rollers 5 do not come over the annular projection stopper 10 which abuts against the end surface 7*a* of the rib 7 at the other end, and the needle rollers 5 are prevented from falling off from the cage 3, and further the cage 3 is prevented from falling off from the outer ring 2.

Further, even if a load is applied to the needle rollers 5 in the axial direction, and some clearance is formed between the needle rollers 5 and the annular projection stopper 10 of the cage 3, a clearance is not formed between the annular projection stopper 10 of the cage 3 and the end surface 7*a* of the rib 7 at the other end. Therefore, although lubricant 13, such as grease, inside the bearing may flow out from the clearance between the needle rollers 5 and the annular projection stopper 10 to the outer circumferential surface of the shaft 15, the lubricant 13 does not flow out from a portion between the annular projection stopper 10 of the cage 3 and the end surface 7*a* of the rib 7 at the other end to the exterior.

In view of above, the lubricant 13, such as grease, inside the bearing can be supplied to a portion where the lubricant 13 is needed, such as the raceway surface 2*a* of the outer ring for the needle rollers 5 and the outer circumferential surface of the shaft 15, and the long life lubricating performance of the drawn cup roller bearing 1 can be secured and the bearing life can be extended.

Further, since the cage 3 is made of synthetic resin and the annular metal wire 11 is embedded inside the annular projection stopper 10, even if the surface of the annular projection stopper 10 which abuts against the end surface 7*a* of the rib 7 at the other end of the outer ring 2 is worn away, because of the annular metal wire 11, the abrasion is stopped at the annular projection stopper 11. Therefore, abrasion resistance is improved.

Second Embodiment

Figure 4:
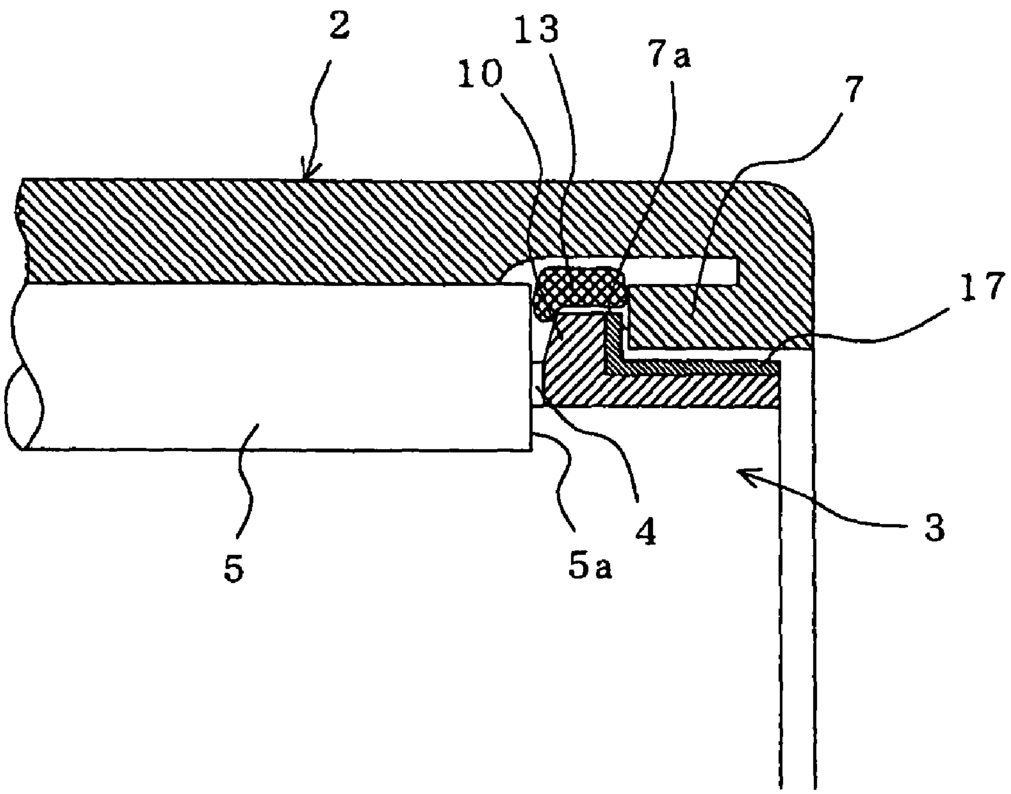
FIG. 4 is a sectional view showing a main part of a drawn cup roller bearing according to a second embodiment of the present invention.

FIG. 4 is a sectional view showing a main part of a drawn cup roller bearing according to a second embodiment of the present invention.

In the first embodiment, the cage 3 is made of synthetic resin. On the other hand, in the second embodiment, the cage 3 is made of steel, which is a difference from the first embodiment.

Further, the abutment surface of the annular projection stopper 10 of the cage 3 with respect to the end surface 7*a* of the rib 7 at the other end of the outer ring 2 and a portion of the outer circumferential surface of the cage 3 which is located outside of the annular projection stopper 10 are coated with resin-made low friction material 17.

Therefore, since the surface of the annular projection stopper 10 of the cage 3 made of the steel where the low friction material 17 is coated has a low friction property, the abrasion resistance is improved.

What is claimed is:

1. A drawn cup roller bearing comprising:

an outer ring including a raceway surface;

a first rib formed at one end of the outer ring by being bent substantially perpendicular to the raceway surface;

a second rib formed at an other end of the outer ring by being bent inwardly so as to be substantially parallel to the raceway surface;

a cage including pockets for holding rollers, respectively; and an annular projection stopper which is projected radially outwardly and provided over an entire outer circumference at a pocket side position of an outer circumferential surface of the cage, wherein an end surface of the cage abuts against a part of the first rib, and the annular projection stopper is interposed between an end face of the second rib which faces the rollers and the rollers in a state that the cage is assembled into the outer ring, and wherein a gap adapted to accommodate a lubricant is formed between a radially outer surface of the annular projection stopper and an inner surface of the outer ring facing the annular projection stopper.

2. The drawn cup roller bearing according to claim 1, wherein the cage comprises synthetic resin, and an annular metal wire is embedded inside the annular projection stopper.

3. The drawn cup roller bearing according to claim 1, wherein the cage comprises metal, and an abutment surface of the annular projection stopper with respect to the end surface of the second rib and a portion of the outer circumferential surface of the cage which is located axially outside of the annular projection stopper are coated with a material comprising a friction property which is less than a friction property of the cage.

4. The drawn cup roller bearing according to claim 1, wherein the gap is continuously formed between an outer radial surface of the second rib and the inner surface of the outer ring.

5. The drawn cup roller bearing according to claim 1, wherein a radially inner surface of an axially outer edge of the cage comprises a uniform radius.

* * * * *